(12) United States Patent
Hayes et al.

(10) Patent No.: US 9,367,243 B1
(45) Date of Patent: Jun. 14, 2016

(54) SCALABLE NON-UNIFORM STORAGE SIZES

(71) Applicant: Pure Storage, Inc., Mountain View, CA (US)

(72) Inventors: John Hayes, Mountain View, CA (US); John Colgrove, Mountain View, CA (US); Robert Lee, Mountain View, CA (US); Joshua Robinson, Mountain View, CA (US); Peter Vajgel, Mountain View, CA (US); John Davis, Mountain View, CA (US); Par Botes, Mountain View, CA (US)

(73) Assignee: Pure Storage, Inc., Mountain View, CA (US)

( * ) Notice: Subject to any disclaimer, the term of this patent is extended or adjusted under 35 U.S.C. 154(b) by 192 days.

(21) Appl. No.: 14/296,167

(22) Filed: Jun. 4, 2014

(51) Int. Cl.
*G06F 3/06* (2006.01)

(52) U.S. Cl.
CPC .............. *G06F 3/0608* (2013.01); *G06F 3/065* (2013.01); *G06F 3/0688* (2013.01); *G06F 3/0689* (2013.01)

(58) Field of Classification Search
CPC ..... G06F 3/0608; G06F 3/065; G06F 3/0688; G06F 3/0689
USPC .......... 711/103, 154, 156, 158, 170; 713/340; 714/6.2, 6.24, 6.32; 365/185.33
See application file for complete search history.

(56) References Cited

U.S. PATENT DOCUMENTS

| | | | |
|---|---|---|---|
| 6,535,417 B2 * | 3/2003 | Tsuda | G11C 11/412 365/154 |
| 6,725,392 B1 | 4/2004 | Frey et al. | |
| 7,778,960 B1 | 8/2010 | Chatterjee et al. | |
| 7,908,448 B1 | 3/2011 | Chatterjee et al. | |
| 8,010,485 B1 | 8/2011 | Chatterjee et al. | |
| 8,010,829 B1 | 8/2011 | Chatterjee et al. | |
| 8,046,548 B1 | 10/2011 | Chatterjee et al. | |
| 8,086,911 B1 | 12/2011 | Taylor | |
| 8,145,838 B1 | 3/2012 | Miller et al. | |
| 8,244,999 B1 | 8/2012 | Chatterjee et al. | |
| 8,327,080 B1 | 12/2012 | Der | |
| 8,375,146 B2 * | 2/2013 | Sinclair | G06F 13/42 709/220 |
| 8,479,037 B1 | 7/2013 | Chatterjee et al. | |
| 8,498,967 B1 | 7/2013 | Chatterjee et al. | |
| 8,522,073 B2 | 8/2013 | Cohen | |
| 8,595,455 B2 | 11/2013 | Chatterjee et al. | |
| 8,627,136 B2 | 1/2014 | Shankar et al. | |

(Continued)

OTHER PUBLICATIONS

Storer, Mark W., et al., "Pergamum: Replacing Tape with Energy Efficient, Reliable, Disk-Based Archival Storage," Fast '08: 6th USENIX Conference on File and Storage Technologies, San Jose. CA, Feb. 26-29, 2008 pp. 1-16.

(Continued)

*Primary Examiner* — Stephen Elmore
(74) *Attorney, Agent, or Firm* — Womble Carlyle Sandridge & Rice LLP

(57) ABSTRACT

A plurality of storage nodes in a single chassis is provided. Each of the plurality of storage nodes has a storage capacity with nonvolatile solid-state memory for user data storage. The plurality of storage nodes is configured to support uniform storage capacities and non-uniform storage capacities among the plurality of storage nodes, as a storage cluster. The plurality of storage nodes is configured to distribute the user data and metadata throughout the plurality of storage nodes such that the plurality of storage nodes can read the user data, using erasure coding, despite loss of two of the plurality of storage nodes.

20 Claims, 8 Drawing Sheets

(56) References Cited

U.S. PATENT DOCUMENTS

| | | |
|---|---|---|
| 8,700,875 B1 | 4/2014 | Barron et al. |
| 2008/0295118 A1 | 11/2008 | Liao |
| 2010/0268908 A1 | 10/2010 | Ouyang et al. |
| 2013/0060884 A1 | 3/2013 | Bernbo et al. |
| 2013/0073894 A1 | 3/2013 | Xavier et al. |
| 2014/0047263 A1 | 2/2014 | Coatney et al. |
| 2014/0136880 A1 | 5/2014 | Shankar et al. |
| 2015/0039645 A1* | 2/2015 | Lewis .............. G06F 17/30156 707/769 |
| 2015/0039849 A1* | 2/2015 | Lewis .................. G06F 12/109 711/203 |
| 2015/0100746 A1* | 4/2015 | Rychlik .............. G06F 12/0607 711/157 |
| 2015/0180714 A1* | 6/2015 | Chunn ................ H04L 41/0813 709/221 |

OTHER PUBLICATIONS

Hwang, Kai, et al. "RAID-x: A New Distributed Disk Array for I/O-Centric Cluster Computing," HPDC '00 Proceedings of the 9th IEEE International Symposium on High Performance Distributed Computing, IEEE, 2000, pp. 279-286.

* cited by examiner

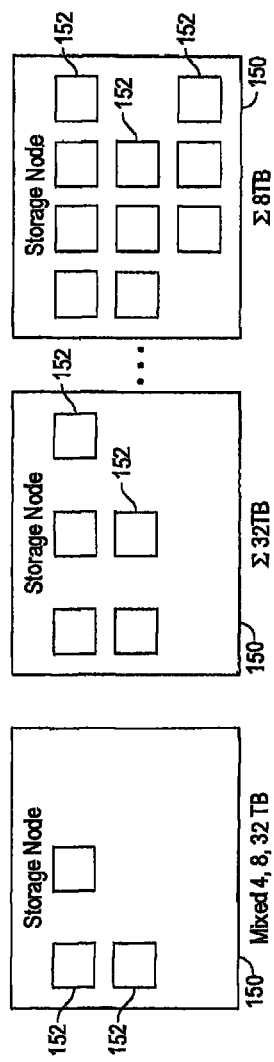
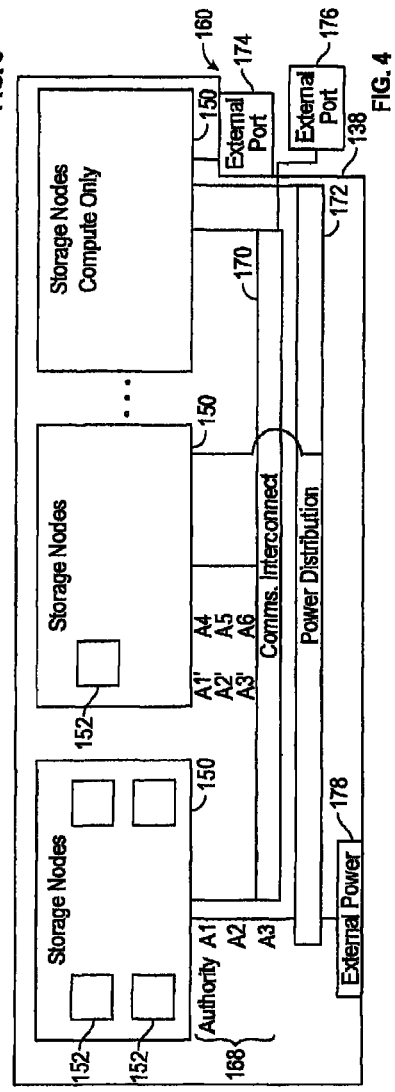

SCALABLE NON-UNIFORM STORAGE SIZES

BACKGROUND

Solid-state memory, such as flash, is currently in use in solid-state drives (SSD) to augment or replace conventional hard disk drives (HDD), writable CD (compact disk) or writable DVD (digital versatile disk) drives, collectively known as spinning media, and tape drives, for storage of large amounts of data. Flash and other solid-state memories have characteristics that differ from spinning media. Yet, many solid-state drives are designed to conform to hard disk drive standards for compatibility reasons, which makes it difficult to provide enhanced features or take advantage of unique aspects of flash and other solid-state memory.

It is within this context that the embodiments arise.

SUMMARY

In some embodiments, a plurality of storage nodes in a single chassis is provided. Each of the plurality of storage nodes has a storage capacity with nonvolatile solid-state memory for user data storage. The plurality of storage nodes is configured to support uniform storage capacities and non-uniform storage capacities among the plurality of storage nodes, as a storage cluster. The plurality of storage nodes is configured to distribute the user data and metadata throughout the plurality of storage nodes such that the plurality of storage nodes can read the user data, using erasure coding, despite loss of two of the plurality of storage nodes.

Other aspects and advantages of the embodiments will become apparent from the following detailed description taken in conjunction with the accompanying drawings which illustrate, by way of example, the principles of the described embodiments.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

FIG. 3 is a block diagram showing multiple storage nodes and non-volatile solid state storage with differing capacities, suitable for use in the storage cluster of FIG. 1 in accordance with some embodiments.

FIG. 4 is a block diagram showing an interconnect switch coupling multiple storage nodes in accordance with some embodiments.

DETAILED DESCRIPTION

Figure 1:
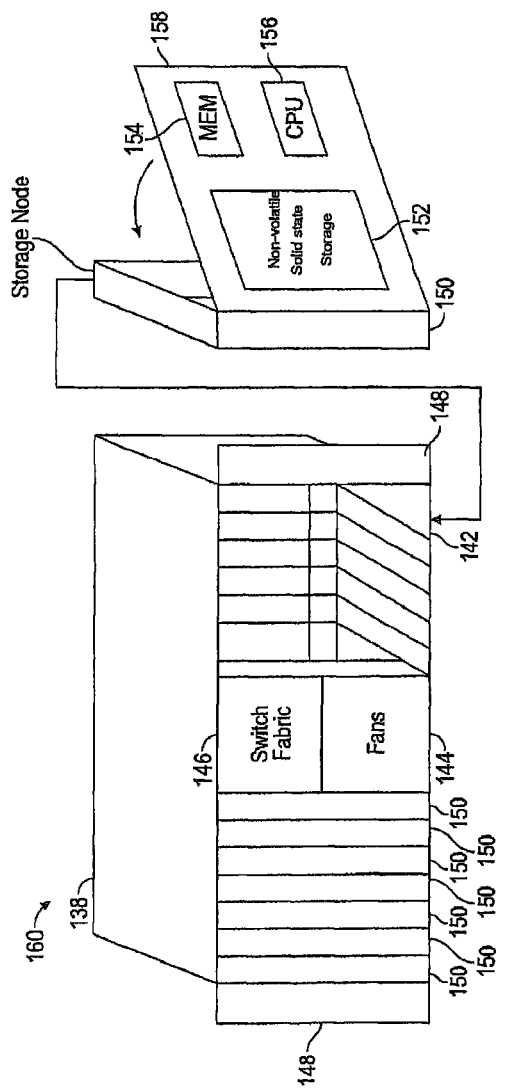
FIG. 1 is a perspective view of a storage cluster with multiple storage nodes and internal storage coupled to each storage node to provide network attached storage, in accordance with some embodiments.

The embodiments below describe a storage cluster that stores user data, such as user data originating from one or more user or client systems or other sources external to the storage cluster. The storage cluster distributes user data across storage nodes housed within a chassis, using erasure coding and redundant copies of metadata. Erasure coding refers to a method of data protection in which data is broken into fragments, expanded and encoded with redundant data pieces and stored across a set of different locations, such as disks, storage nodes or geographic locations. Flash memory is one type of solid-state memory that may be integrated with the embodiments, although the embodiments may be extended to other types of solid-state memory or other storage medium, including non-solid state memory. Control of storage locations and workloads are distributed across the storage locations in a clustered peer-to-peer system. Tasks such as mediating communications between the various storage nodes, detecting when a storage node has become unavailable, and balancing I/Os (inputs and outputs) across the various storage nodes, are all handled on a distributed basis. Data is laid out or distributed across multiple storage nodes in data fragments or stripes that support data recovery in some embodiments. Ownership of data can be reassigned within a cluster, independent of input and output patterns. This architecture described in more detail below allows a storage node in the cluster to fail, with the system remaining operational, since the data can be reconstructed from other storage nodes and thus remain available for input and output operations. In various embodiments, a storage node may be referred to as a cluster node, a blade, or a server.

The storage cluster is contained within a chassis, i.e., an enclosure housing one or more storage nodes. A mechanism to provide power to each storage node, such as a power distribution bus, and a communication mechanism, such as a communication bus that enables communication between the storage nodes are included within the chassis. The storage cluster can run as an independent system in one location according to some embodiments. In one embodiment, a chassis contains at least two instances of both the power distribution and the communication bus which may be enabled or disabled independently. The internal communication bus may be an Ethernet bus, however, other technologies such as Peripheral Component Interconnect (PCI) Express, InfiniBand, and others, are equally suitable. The chassis provides a port for an external communication bus for enabling communication between multiple chassis, directly or through a switch, and with client systems. The external communication may use a technology such as Ethernet, InfiniBand, Fibre Channel, etc. In some embodiments, the external communication bus uses different communication bus technologies for inter-chassis and client communication. If a switch is deployed within or between chassis, the switch may act as a translation between multiple protocols or technologies. When multiple chassis are connected to define a storage cluster, the storage cluster may be accessed by a client using either proprietary interfaces or standard interfaces such as network file system (NFS), common internet file system (CIFS), small computer system interface (SCSI) or hypertext transfer protocol (HTTP). Translation from the client protocol may occur at the switch, chassis external communication bus or within each storage node.

Each storage node may be one or more storage servers and each storage server is connected to one or more non-volatile solid state memory units, which may be referred to as storage units. One embodiment includes a single storage server in each storage node and between one to eight non-volatile solid state memory units, however this one example is not meant to be limiting. The storage server may include a processor, dynamic random access memory (DRAM) and interfaces for the internal communication bus and power distribution for each of the power buses. Inside the storage node, the interfaces and storage unit share a communication bus, e.g., PCI Express, in some embodiments. The non-volatile solid state memory units may directly access the internal communication bus interface through a storage node communication bus, or request the storage node to access the bus interface. The non-volatile solid state memory unit contains an embedded central processing unit (CPU), solid state storage controller, and a quantity of solid state mass storage, e.g., between 2-32 terabytes (TB) in some embodiments. An embedded volatile storage medium, such as DRAM, and an energy reserve apparatus are included in the non-volatile solid state memory unit. In some embodiments, the energy reserve apparatus is a capacitor, super-capacitor, or battery that enables transferring a subset of DRAM contents to a stable storage medium in the case of power loss. In some embodiments, the non-volatile solid state memory unit is constructed with a storage class memory, such as phase change or magnetoresistive random access memory (MRAM) that substitutes for DRAM and enables a reduced power hold-up apparatus.

One of many features of the storage nodes and non-volatile solid state storage is the ability to proactively rebuild data in a storage cluster. The storage nodes and non-volatile solid state storage can determine when a storage node or non-volatile solid state storage in the storage cluster is unreachable, independent of whether there is an attempt to read data involving that storage node or non-volatile solid state storage. The storage nodes and non-volatile solid state storage then cooperate to recover and rebuild the data in at least partially new locations. This constitutes a proactive rebuild, in that the system rebuilds data without waiting until the data is needed for a read access initiated from a client system employing the storage cluster. These and further details of the storage memory and operation thereof are discussed below.

FIG. 1 is a perspective view of a storage cluster 160, with multiple storage nodes 150 and internal solid-state memory coupled to each storage node to provide network attached storage or storage area network, in accordance with some embodiments. A network attached storage, storage area network, or a storage cluster, or other storage memory, could include one or more storage clusters 160, each having one or more storage nodes 150, in a flexible and reconfigurable arrangement of both the physical components and the amount of storage memory provided thereby. The storage cluster 160 is designed to fit in a rack, and one or more racks can be set up and populated as desired for the storage memory. The storage cluster 160 has a chassis 138 having multiple slots 142. It should be appreciated that chassis 138 may be referred to as a housing, enclosure, or rack unit. In one embodiment, the chassis 138 has fourteen slots 142, although other numbers of slots are readily devised. For example, some embodiments have four slots, eight slots, sixteen slots, thirty-two slots, or other suitable number of slots. Each slot 142 can accommodate one storage node 150 in some embodiments. Chassis 138 includes flaps 148 that can be utilized to mount the chassis 138 on a rack. Fans 144 provide air circulation for cooling of the storage nodes 150 and components thereof, although other cooling components could be used, or an embodiment could be devised without cooling components. A switch fabric 146 couples storage nodes 150 within chassis 138 together and to a network for communication to the memory. In an embodiment depicted in FIG. 1, the slots 142 to the left of the switch fabric 146 and fans 144 are shown occupied by storage nodes 150, while the slots 142 to the right of the switch fabric 146 and fans 144 are empty and available for insertion of storage node 150 for illustrative purposes. This configuration is one example, and one or more storage nodes 150 could occupy the slots 142 in various further arrangements. The storage node arrangements need not be sequential or adjacent in some embodiments. Storage nodes 150 are hot pluggable, meaning that a storage node 150 can be inserted into a slot 142 in the chassis 138, or removed from a slot 142, without stopping or powering down the system. Upon insertion or removal of storage node 150 from slot 142, the system automatically reconfigures in order to recognize and adapt to the change. Reconfiguration, in some embodiments, includes restoring redundancy and/or rebalancing data or load.

Each storage node 150 can have multiple components. In the embodiment shown here, the storage node 150 includes a printed circuit board 158 populated by a CPU 156, i.e., processor, a memory 154 coupled to the CPU 156, and a non-volatile solid state storage 152 coupled to the CPU 156, although other mountings and/or components could be used in further embodiments. The memory 154 has instructions which are executed by the CPU 156 and/or data operated on by the CPU 156. As further explained below, the non-volatile solid state storage 152 includes flash or, in further embodiments, other types of solid-state memory.

Figure 2:
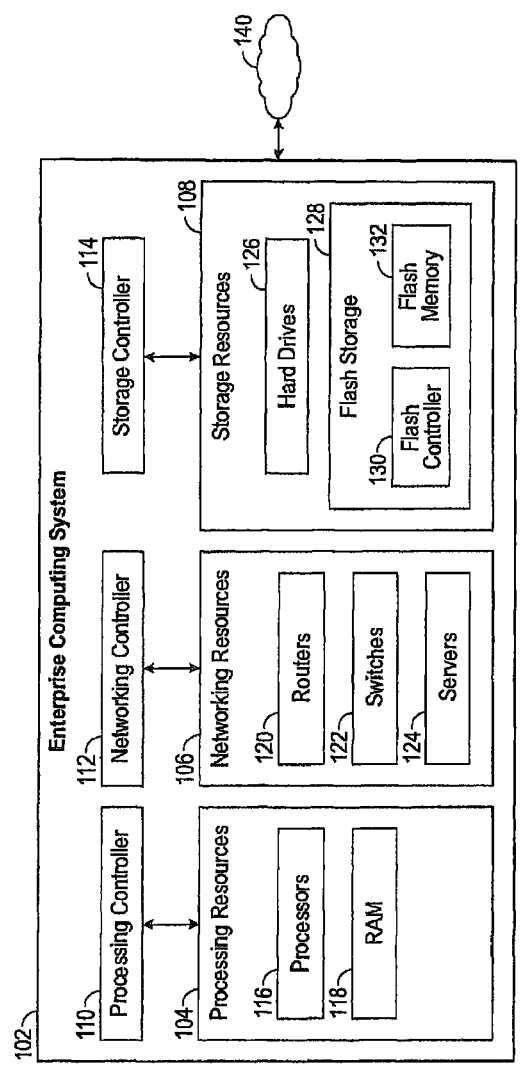
FIG. 2 is a system diagram of an enterprise computing system, which can use one or more of the storage clusters of FIG. 1 as a storage resource in some embodiments.

FIG. 2 is a system diagram of an enterprise computing system 102, which can use one or more of the storage nodes, storage clusters and/or non-volatile solid state storage of FIG. 1 as a storage resource 108. For example, flash storage 128 of FIG. 2 may integrate the storage nodes, storage clusters and/or non-volatile solid state storage of FIG. 1 in some embodiments. The enterprise computing system 102 has processing resources 104, networking resources 106 and storage resources 108, including flash storage 128. A flash controller 130 and flash memory 132 are included in the flash storage 128. In various embodiments, the flash storage 128 could include one or more storage nodes or storage clusters, with the flash controller 130 including the CPUs, and the flash memory 132 including the non-volatile solid state storage of the storage nodes. In some embodiments flash memory 132 may include different types of flash memory or the same type of flash memory. The enterprise computing system 102 illustrates an environment suitable for deployment of the flash storage 128, although the flash storage 128 could be used in other computing systems or devices, larger or smaller, or in variations of the enterprise computing system 102, with fewer or additional resources. The enterprise computing system 102 can be coupled to a network 140, such as the Internet, in order to provide or make use of services. For example, the enterprise computing system 102 could provide cloud services, physical computing resources, or virtual computing services.

In the enterprise computing system 102, various resources are arranged and managed by various controllers. A processing controller 110 manages the processing resources 104, which include processors 116 and random-access memory (RAM) 118. Networking controller 112 manages the networking resources 106, which include routers 120, switches 122, and servers 124. A storage controller 114 manages storage resources 108, which include hard drives 126 and flash storage 128. Other types of processing resources, networking resources, and storage resources could be included with the embodiments. In some embodiments, the flash storage 128 completely replaces the hard drives 126. The enterprise computing system 102 can provide or allocate the various resources as physical computing resources, or in variations, as virtual computing resources supported by physical computing resources. For example, the various resources could be implemented using one or more servers executing software. Files or data objects, or other forms of data, are stored in the storage resources 108.

In various embodiments, an enterprise computing system 102 could include multiple racks populated by storage clusters, and these could be located in a single physical location such as in a cluster or a server farm. In other embodiments the multiple racks could be located at multiple physical locations such as in various cities, states or countries, connected by a network. Each of the racks, each of the storage clusters, each of the storage nodes, and each of the non-volatile solid state storage could be individually configured with a respective amount of storage space, which is then reconfigurable independently of the others. Storage capacity can thus be flexibly added, upgraded, subtracted, recovered and/or reconfigured at each of the non-volatile solid state storages. As mentioned previously, each storage node could implement one or more servers in some embodiments.

FIG. 3 is a block diagram showing multiple storage nodes 150 and non-volatile solid state storage 152 with differing capacities, suitable for use in the chassis of FIG. 1. Each storage node 150 can have one or more units of non-volatile solid state storage 152. Each non-volatile solid state storage 152 may include differing capacity from other non-volatile solid state storage 152 on a storage node 150 or in other storage nodes 150 in some embodiments. Alternatively, all of the non-volatile solid state storages 152 on a storage node or on multiple storage nodes can have the same capacity or combinations of the same and/or differing capacities. This flexibility is illustrated in FIG. 3, which shows an example of one storage node 150 having mixed non-volatile solid state storage 152 of four, eight and thirty-two TB capacity, another storage node 150 having non-volatile solid state storage 152 each of thirty-two TB capacity, and still another storage node having non-volatile solid state storage 152 each of eight TB capacity. Various further combinations and capacities are readily devised in accordance with the teachings herein. In the context of clustering, e.g., clustering storage to form a storage cluster, a storage node can be or include a non-volatile solid state storage 152. Non-volatile solid state storage 152 is a convenient clustering point as the non-volatile solid state storage 152 may include a nonvolatile random access memory (NVRAM) component, as will be further described below.

Referring to FIGS. 1 and 3, storage cluster 160 is scalable, meaning that storage capacity with non-uniform storage sizes is readily added, as described above. One or more storage nodes 150 can be plugged into or removed from each chassis and the storage cluster self-configures in some embodiments. Plug-in storage nodes 150, whether installed in a chassis as delivered or later added, can have different sizes. For example, in one embodiment a storage node 150 can have any multiple of 4 TB, e.g., 8 TB, 12 TB, 16 TB, 32 TB, etc. In further embodiments, a storage node 150 could have any multiple of other storage amounts or capacities. Storage capacity of each storage node 150 is broadcast, and influences decisions of how to stripe the data. For maximum storage efficiency, an embodiment can self-configure as wide as possible in the stripe, subject to a predetermined requirement of continued operation with loss of up to one, or up to two, non-volatile solid state storage units 152 or storage nodes 150 within the chassis.

FIG. 4 is a block diagram showing a communications interconnect 170 and power distribution bus 172 coupling multiple storage nodes 150. Referring back to FIG. 1, the communications interconnect 170 can be included in or implemented with the switch fabric 146 in some embodiments. Where multiple storage clusters 160 occupy a rack, the communications interconnect 170 can be included in or implemented with a top of rack switch, in some embodiments. As illustrated in FIG. 4, storage cluster 160 is enclosed within a single chassis 138. External port 176 is coupled to storage nodes 150 through communications interconnect 170, while external port 174 is coupled directly to a storage node. External power port 178 is coupled to power distribution bus 172. Storage nodes 150 may include varying amounts and differing capacities of non-volatile solid state storage 152 as described with reference to FIG. 3. In addition, one or more storage nodes 150 may be a compute only storage node as illustrated in FIG. 4. Authorities 168 are implemented on the non-volatile solid state storages 152, for example as lists or other data structures stored in memory. In some embodiments the authorities are stored within the non-volatile solid state storage 152 and supported by software executing on a controller or other processor of the non-volatile solid state storage 152. In a further embodiment, authorities 168 are implemented on the storage nodes 150, for example as lists or other data structures stored in the memory 154 and supported by software executing on the CPU 156 of the storage node 150. Authorities 168 control how and where data is stored in the non-volatile solid state storages 152 in some embodiments. This control assists in determining which type of erasure coding scheme is applied to the data, and which storage nodes 150 have which portions of the data. Each authority 168 may be assigned to a non-volatile solid state storage 152. Each authority may control a range of inode numbers, segment numbers, or other data identifiers which are assigned to data by a file system, by the storage nodes 150, or by the non-volatile solid state storage 152, in various embodiments.

Every piece of data, and every piece of metadata, has redundancy in the system in some embodiments. In addition, every piece of data and every piece of metadata has an owner, which may be referred to as an authority. If that authority is unreachable, for example through failure of a storage node, there is a plan of succession for how to find that data or that metadata. In various embodiments, there are redundant copies of authorities 168. Authorities 168 have a relationship to storage nodes 150 and non-volatile solid state storage 152 in some embodiments. Each authority 168, covering a range of data segment numbers or other identifiers of the data, may be assigned to a specific non-volatile solid state storage 152. In some embodiments the authorities 168 for all of such ranges are distributed over the non-volatile solid state storages 152 of a storage cluster. Each storage node 150 has a network port that provides access to the non-volatile solid state storage(s) 152 of that storage node 150. Data can be stored in a segment, which is associated with a segment number and that segment number is an indirection for a configuration of a RAID (redundant array of independent disks) stripe in some embodiments. The assignment and use of the authorities 168 thus establishes an indirection to data. Indirection may be referred to as the ability to reference data indirectly, in this case via an authority 168, in accordance with some embodiments. A segment identifies a set of non-volatile solid state storage 152 and a local identifier into the set of non-volatile solid state storage 152 that may contain data. In some embodiments, the local identifier is an offset into the device and may be reused sequentially by multiple segments. In other embodiments the local identifier is unique for a specific segment and never reused. The offsets in the non-volatile solid state storage 152 are applied to locating data for writing to or reading from the non-volatile solid state storage 152 (in the form of a RAID stripe). Data is striped across multiple units of non-volatile solid state storage 152, which may include or be different from the non-volatile solid state storage 152 having the authority 168 for a particular data segment.

If there is a change in where a particular segment of data is located, e.g., during a data move or a data reconstruction, the authority 168 for that data segment should be consulted, at that non-volatile solid state storage 152 or storage node 150 having that authority 168. In order to locate a particular piece of data, embodiments calculate a hash value for a data segment or apply an Mode number or a data segment number. The output of this operation points to a non-volatile solid state storage 152 having the authority 168 for that particular piece of data. In some embodiments there are two stages to this operation. The first stage maps an entity identifier (ID), e.g., a segment number, Mode number, or directory number to an authority identifier. This mapping may include a calculation such as a hash or a bit mask. The second stage is mapping the authority identifier to a particular non-volatile solid state storage 152, which may be done through an explicit mapping. The operation is repeatable, so that when the calculation is performed, the result of the calculation repeatably and reliably points to a particular non-volatile solid state storage 152 having that authority 168. The operation may include the set of reachable storage nodes as input. If the set of reachable non-volatile solid state storage units changes the optimal set changes. In some embodiments, the persisted value is the current assignment (which is always true) and the calculated value is the target assignment the cluster will attempt to reconfigure towards. This calculation may be used to determine the optimal non-volatile solid state storage 152 for an authority in the presence of a set of non-volatile solid state storage 152 that are reachable and constitute the same cluster. The calculation also determines an ordered set of peer non-volatile solid state storage 152 that will also record the authority to non-volatile solid state storage mapping so that the authority may be determined even if the assigned non-volatile solid state storage is unreachable. A duplicate or substitute authority 168 may be consulted if a specific authority 168 is unavailable in some embodiments.

With reference to FIGS. 1-4, two of the many tasks of the CPU 156 on a storage node 150 are to break up write data, and reassemble read data. When the system has determined that data is to be written, the authority 168 for that data is located as above. When the segment ID for data is already determined the request to write is forwarded to the non-volatile solid state storage 152 currently determined to be the host of the authority 168 determined from the segment. The host CPU 156 of the storage node 150, on which the non-volatile solid state storage 152 and corresponding authority 168 reside, then breaks up or shards the data and transmits the data out to various non-volatile solid state storage 152. The transmitted data is written as a data stripe in accordance with an erasure coding scheme. In some embodiments, data is requested to be pulled, and in other embodiments, data is pushed. In reverse, when data is read, the authority 168 for the segment ID containing the data is located as described above. The host CPU 156 of the storage node 150 on which the non-volatile solid state storage 152 and corresponding authority 168 reside requests the data from the non-volatile solid state storage and corresponding storage nodes pointed to by the authority. In some embodiments the data is read from flash storage as a data stripe. The host CPU 156 of storage node 150 then reassembles the read data, correcting any errors (if present) according to the appropriate erasure coding scheme, and forwards the reassembled data to the network. In further embodiments, some or all of these tasks can be handled in the non-volatile solid state storage 152. In some embodiments, the segment host requests the data be sent to storage node 150 by requesting pages from storage and then sending the data to the storage node making the original request.

In some systems, for example in UNIX-style file systems, data is handled with an index node or inode, which specifies a data structure that represents an object in a file system. The object could be a file or a directory, for example. Metadata may accompany the object, as attributes such as permission data and a creation timestamp, among other attributes. A segment number could be assigned to all or a portion of such an object in a file system. In other systems, data segments are handled with a segment number assigned elsewhere. For purposes of discussion, the unit of distribution is an entity, and an entity can be a file, a directory or a segment. That is, entities are units of data or metadata stored by a storage system. Entities are grouped into sets called authorities. Each authority has an authority owner, which is a storage node that has the exclusive right to update the entities in the authority. In other words, a storage node contains the authority, and that the authority, in turn, contains entities.

A segment is a logical container of data in accordance with some embodiments. A segment is an address space between medium address space and physical flash locations, i.e., the data segment number, are in this address space. Segments may also contain metadata, which enable data redundancy to be restored (rewritten to different flash locations or devices) without the involvement of higher level software. In one embodiment, an internal format of a segment contains client data and medium mappings to determine the position of that data. Each data segment is protected, e.g., from memory and other failures, by breaking the segment into a number of data and parity shards, where applicable. The data and parity shards are distributed, i.e., striped, across non-volatile solid state storage 152 coupled to the host CPUs 156 (See FIG. 5) in accordance with an erasure coding scheme. Usage of the term segments refers to the container and its place in the address space of segments in some embodiments. Usage of the term stripe refers to the same set of shards as a segment and includes how the shards are distributed along with redundancy or parity information in accordance with some embodiments.

A series of address-space transformations takes place across an entire storage system. At the top is the directory entries (file names) which link to an inode. Inodes point into medium address space, where data is logically stored. Medium addresses may be mapped through a series of indirect mediums to spread the load of large files, or implement data services like deduplication or snapshots. Medium addresses may be mapped through a series of indirect mediums to spread the load of large files, or implement data services like deduplication or snapshots. Segment addresses are then translated into physical flash locations. Physical flash locations have an address range bounded by the amount of flash in the system in accordance with some embodiments. Medium addresses and segment addresses are logical containers, and in some embodiments use a 128 bit or larger identifier so as to be practically infinite, with a likelihood of reuse calculated as longer than the expected life of the system. Addresses from logical containers are allocated in a hierarchical fashion in some embodiments. Initially, each non-volatile solid state storage 152 may be assigned a range of address space. Within this assigned range, the non-volatile solid state storage 152 is able to allocate addresses without synchronization with other non-volatile solid state storage 152.

Data and metadata is stored by a set of underlying storage layouts that are optimized for varying workload patterns and storage devices. These layouts incorporate multiple redundancy schemes, compression formats and index algorithms. Some of these layouts store information about authorities and authority masters, while others store file metadata and file data. The redundancy schemes include error correction codes that tolerate corrupted bits within a single storage device (such as a NAND flash chip), erasure codes that tolerate the failure of multiple storage nodes, and replication schemes that tolerate data center or regional failures. In some embodiments, low density parity check (LDPC) code is used within a single storage unit. Reed-Solomon encoding is used within a storage cluster, and mirroring is used within a storage grid in some embodiments. Metadata may be stored using an ordered log structured index (such as a Log Structured Merge Tree), and large data may not be stored in a log structured layout.

In order to maintain consistency across multiple copies of an entity, the storage nodes agree implicitly on two things through calculations: (1) the authority that contains the entity, and (2) the storage node that contains the authority. The assignment of entities to authorities can be done by pseudo-randomly assigning entities to authorities, by splitting entities into ranges based upon an externally produced key, or by placing a single entity into each authority. Examples of pseudorandom schemes are linear hashing and the Replication Under Scalable Hashing (RUSH) family of hashes, including Controlled Replication Under Scalable Hashing (CRUSH). In some embodiments, pseudo-random assignment is utilized only for assigning authorities to nodes because the set of nodes can change. The set of authorities cannot change so any subjective function may be applied in these embodiments. Some placement schemes automatically place authorities on storage nodes, while other placement schemes rely on an explicit mapping of authorities to storage nodes. In some embodiments, a pseudorandom scheme is utilized to map from each authority to a set of candidate authority owners. A pseudorandom data distribution function related to CRUSH may assign authorities to storage nodes and create a list of where the authorities are assigned. Each storage node has a copy of the pseudorandom data distribution function, and can arrive at the same calculation for distributing, and later finding or locating an authority. Each of the pseudorandom schemes requires the reachable set of storage nodes as input in some embodiments in order to conclude the same target nodes. Once an entity has been placed in an authority, the entity may be stored on physical devices so that no expected failure will lead to unexpected data loss. In some embodiments, rebalancing algorithms attempt to store the copies of all entities within an authority in the same layout and on the same set of machines.

Examples of expected failures include device failures, stolen machines, datacenter fires, and regional disasters, such as nuclear or geological events. Different failures lead to different levels of acceptable data loss. In some embodiments, a stolen storage node impacts neither the security nor the reliability of the system, while depending on system configuration, a regional event could lead to no loss of data, a few seconds or minutes of lost updates, or even complete data loss.

In the embodiments, the placement of data for storage redundancy is independent of the placement of authorities for data consistency. In some embodiments, storage nodes that contain authorities do not contain any persistent storage. Instead, the storage nodes are connected to non-volatile solid state storage units that do not contain authorities. The communications interconnect between storage nodes and non-volatile solid state storage units consists of multiple communication technologies and has non-uniform performance and fault tolerance characteristics. In some embodiments, as mentioned above, non-volatile solid state storage units are connected to storage nodes via PCI express, storage nodes are connected together within a single chassis using an Ethernet backplane, and chassis are connected together to form a storage cluster. Storage clusters are connected to clients using Ethernet or fiber channel in some embodiments. If multiple storage clusters are configured into a storage grid, the multiple storage clusters are connected using the Internet or other long-distance networking links, such as a "metro scale" link or private link that does not traverse the internet.

Authority owners have the exclusive right to modify entities, to migrate entities from one non-volatile solid state storage unit to another non-volatile solid state storage unit, and to add and remove copies of entities. This allows for maintaining the redundancy of the underlying data. When an authority owner fails, is going to be decommissioned, or is overloaded, the authority is transferred to a new storage node. Transient failures make it non-trivial to ensure that all non-faulty machines agree upon the new authority location. The ambiguity that arises due to transient failures can be achieved automatically by a consensus protocol such as Paxos, hot-warm failover schemes, via manual intervention by a remote system administrator, or by a local hardware administrator (such as by physically removing the failed machine from the cluster, or pressing a button on the failed machine). In some embodiments, a consensus protocol is used, and failover is automatic. If too many failures or replication events occur in too short a time period, the system goes into a self-preservation mode and halts replication and data movement activities until an administrator intervenes in accordance with some embodiments.

As authorities are transferred between storage nodes and authority owners update entities in their authorities, the system transfers messages between the storage nodes and non-volatile solid state storage units. With regard to persistent messages, messages that have different purposes are of different types. Depending on the type of the message, the system maintains different ordering and durability guarantees. As the persistent messages are being processed, the messages are temporarily stored in multiple durable and non-durable storage hardware technologies. In some embodiments, messages are stored in RAM, NVRAM and on NAND flash devices, and a variety of protocols are used in order to make efficient use of each storage medium. Latency-sensitive client requests may be persisted in replicated NVRAM, and then later NAND, while background rebalancing operations are persisted directly to NAND.

Persistent messages are persistently stored prior to being replicated. This allows the system to continue to serve client requests despite failures and component replacement. Although many hardware components contain unique identifiers that are visible to system administrators, manufacturer, hardware supply chain and ongoing monitoring quality control infrastructure, applications running on top of the infrastructure address virtualize addresses. These virtualized addresses do not change over the lifetime of the storage system, regardless of component failures and replacements. This allows each component of the storage system to be replaced over time without reconfiguration or disruptions of client request processing.

In some embodiments, the virtualized addresses are stored with sufficient redundancy. A continuous monitoring system correlates hardware and software status and the hardware identifiers. This allows detection and prediction of failures due to faulty components and manufacturing details. The monitoring system also enables the proactive transfer of authorities and entities away from impacted devices before failure occurs by removing the component from the critical path in some embodiments.

Referring to FIGS. 1-4, in addition to component redundancy in the communication channel, storage cluster 160 is configured to allow for the loss of one or more storage nodes 150. In some embodiments this cluster redundancy level may be one for relatively small storage clusters 160 (less than 8 storage nodes 150) and two for relatively larger storage clusters 160 (8 or more storage nodes 150) although any number would be suitable for the cluster redundancy level. In some embodiments, where more storage nodes 150 than the redundancy level are lost, the storage cluster 160 cannot guarantee availability of data or integrity of future updates. As mentioned above, data redundancy is implemented via segments. A segment is formed by selecting equal sized shards from a subset of the non-volatile solid state storage 152, each within a different storage node 150. Shards are reserved to establish the redundancy level, e.g., one or two, and then a remainder constitutes the data (the data shards). The shards are encoded using an ECC scheme such as parity or Reed-Soloman (RAID 6), so that any subset of the shards equal in count to the data shards may be used to reconstruct the complete data. The storage cluster redundancy represents a minimum level of redundancy and it may be exceeded for any individual data element. Segments are stored as a set of non-volatile solid state storage units, roles (data position or parity) and allocation unit local to each non-volatile solid state storage unit. The allocation units may be a physical address or an indirection determined within the non-volatile solid state storage 152. Each shard may be portioned into pages and each page into code words. In some embodiments, the pages are between about 4 kilobytes (kB) and 64 kB, e.g., 16 kB, while the code words are between about 512 bytes to 4 kB, e.g., 1 kB. These sizes are one example and not meant to be limiting as any suitable size for the code words and the pages may be utilized. The code words contain local error correction and a checksum to verify the error correction was successful. This checksum is "salted" with the logical address of the contents meaning that a failure to match the checksum may occur if the data is uncorrectable or misplaced. In some embodiments, when a code word fails a checksum it is converted to an "erasure" for purpose of the error correction algorithm so that the code word may be rebuilt.

If storage nodes 150 are added to the storage cluster 160, the target segment width (data shards and parity shards) changes. Newly allocated segments can adopt these parameters immediately. If the new cluster configuration is too narrow to allow segments to be rebuilt to the target redundancy the segment is replaced with a new segment. If storage cluster 160 has increased the target redundancy an extra redundant shard can be allocated and generated without changing the segment contents. All other segments may remain in place without modification, leaving the system with multiple concurrent segment dimensions. When the target segment is getting wider and more efficient this information can be combined with other information to determine if the segment is a better candidate than most for background processes like wear level or garbage collection. Storage nodes 150 can have differing non-volatile solid state storage 152 of differing sizes in some embodiments. If there are many units of non-volatile solid state storage 152 of each size then the normal allocation rules for segments may apply and the larger size units of non-volatile solid state storage 152 will have more overlapping segments. The storage cluster 160 may also decide to ignore the excess space or allocate segments of narrower width to make use of the extra space.

Larger storage clusters 160 may be divided into storage node groups to increase the redundancy without increasing segment width. As an example, a system of 28 storage nodes 150 may be divided into two groups of 14 each with a segment size of 10+2. When a segment is allocated the system is configured to not select shards from storage nodes in multiple groups. This arrangement ensures that up to four storage nodes may be lost, i.e., two from each group and the system operates normally. Storage node groups may be aligned with a chassis to take advantage of a higher bandwidth communications interconnect 170 for redundant operations. Storage node groups can be combined without any segment reconfiguration. If a storage node group is partitioned, any segment that crosses the two storage node is partitioned. These partitioned segments which are allocated in two storage node groups have their shards realigned within storage nodes before the storage node groups are considered independent. The system may wait for shards to be rewritten according to a normal schedule, rebuild shards into the same storage node group or move the contents into another segment.

The total set of non-volatile solid state storage units that have at least one shard allocated to a segment may be referred to as the referenced set. These non-volatile solid state storage units (via their storage nodes) are organized first into storage node groups, with a redundancy level within each storage node group. Any subset that fulfills the redundancy level in every storage node group is a quorum set, where the entire storage cluster may operate normally. The current set of non-volatile solid state storage units that are operating and may be accessed directly or indirectly via the communication buses is referred to as the reachable set. The storage cluster may be considered to be operating when the reachable set forms a valid quorum. Devices that are referenced but not reachable may be referred to as phantom devices. All data that is stored on the device may be reconstructed from other shards in the same segment. The storage cluster attempts to dereference any phantom device by persistently storing the rebuilt shards on a reachable device. Any non-volatile solid state storage unit that is not already within a storage node that contains a segment shard is a candidate for rebuilding. In some embodiments, rebuilding proceeds by ordinary data maintenance that would lead to deallocation of the overlapping segment, similar to garbage collection. Heuristics that determine the relative efficiency in terms of reading, writing or computation may be used to decide which path is appropriate. When no segments map shards onto a particular non-volatile solid state storage unit the non-volatile solid state storage unit is considered evicted and is no longer required to participate in quorum. When there are no longer any phantom non-volatile solid state storage units, the storage cluster is at full redundancy and may lose further storage nodes while remaining in quorum.

In NVRAM, redundancy is not organized by segments but instead by messages, where each message (128 bytes to 128 kB) establishes its own data stripe. NVRAM is maintained at the same redundancy as segment storage and operates within the same storage node groups in some embodiments. Because messages are stored individually the stripe width is determined both by message size and the storage cluster configuration. Larger messages may be more efficiently stored as wider strips.

Figure 5:
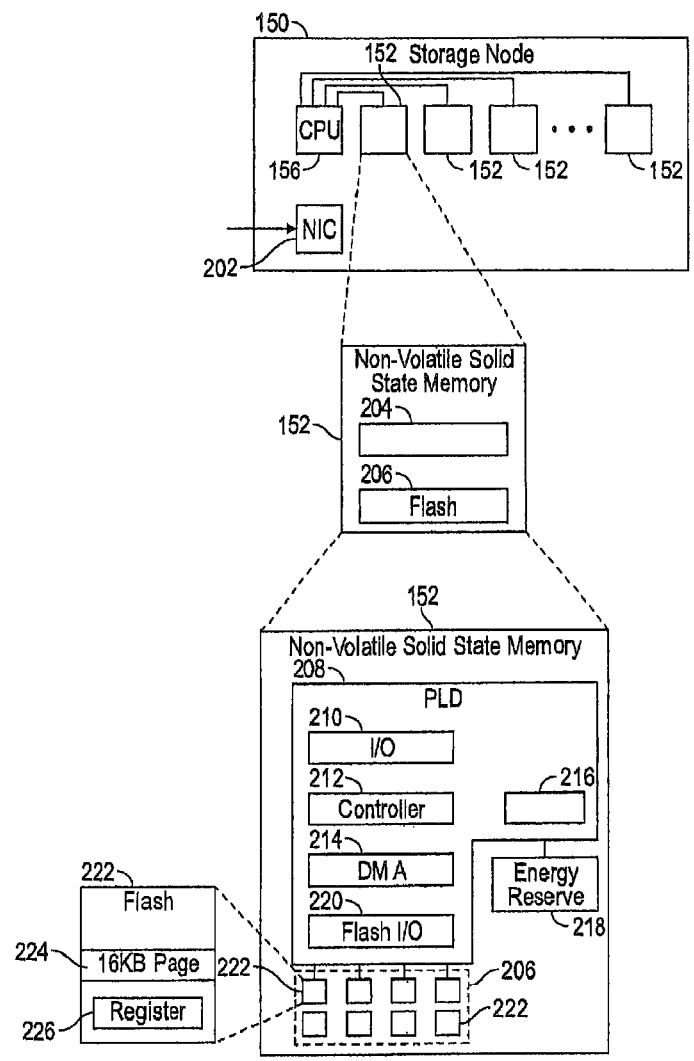
FIG. 5 is a multiple level block diagram, showing contents of a storage node and contents of one of the non-volatile solid state storage units in accordance with some embodiments.

FIG. 5 is a multiple level block diagram, showing contents of a storage node 150 and contents of a non-volatile solid state storage 152 of the storage node 150. Data is communicated to and from the storage node 150 by a network interface controller (NIC) 202 in some embodiments. Each storage node 150 has a CPU 156, and one or more non-volatile solid state storage 152, as discussed above. Moving down one level in FIG. 5, each non-volatile solid state storage 152 has a relatively fast non-volatile solid state memory, such as nonvolatile random access memory (NVRAM) 204, and flash memory 206. In some embodiments, NVRAM 204 may be a component that does not require program/erase cycles (DRAM, MRAM, PCM), and can be a memory that can support being written vastly more often than the memory is read from. Moving down another level in FIG. 5, the NVRAM 204 is implemented in one embodiment as high speed volatile memory, such as dynamic random access memory (DRAM) 216, backed up by energy reserve 218. Energy reserve 218 provides sufficient electrical power to keep the DRAM 216 powered long enough for contents to be transferred to the flash memory 206 in the event of power failure. In some embodiments, energy reserve 218 is a capacitor, super-capacitor, battery, or other device, that supplies a suitable supply of energy sufficient to enable the transfer of the contents of DRAM 216 to a stable storage medium in the case of power loss. The flash memory 206 is implemented as multiple flash dies 222, which may be referred to as packages of flash dies 222 or an array of flash dies 222. It should be appreciated that the flash dies 222 could be packaged in any number of ways, with a single die per package, multiple dies per package (i.e. multichip packages), in hybrid packages, as bare dies on a printed circuit board or other substrate, as encapsulated dies, etc. In the embodiment shown, the non-volatile solid state storage 152 has a controller 212 or other processor, and an input output (I/O) port 210 coupled to the controller 212. I/O port 210 is coupled to the CPU 156 and/or the network interface controller 202 of the flash storage node 150. Flash input output (I/O) port 220 is coupled to the flash dies 222, and a direct memory access unit (DMA) 214 is coupled to the controller 212, the DRAM 216 and the flash dies 222. In the embodiment shown, the I/O port 210, controller 212, DMA unit 214 and flash I/O port 220 are implemented on a programmable logic device (PLD) 208, e.g., a field programmable gate array (FPGA). In this embodiment, each flash die 222 has pages, organized as sixteen kB (kilobyte) pages 224, and a register 226 through which data can be written to or read from the flash die 222. In further embodiments, other types of solid-state memory are used in place of, or in addition to flash memory illustrated within flash die 222.

Figure 6:
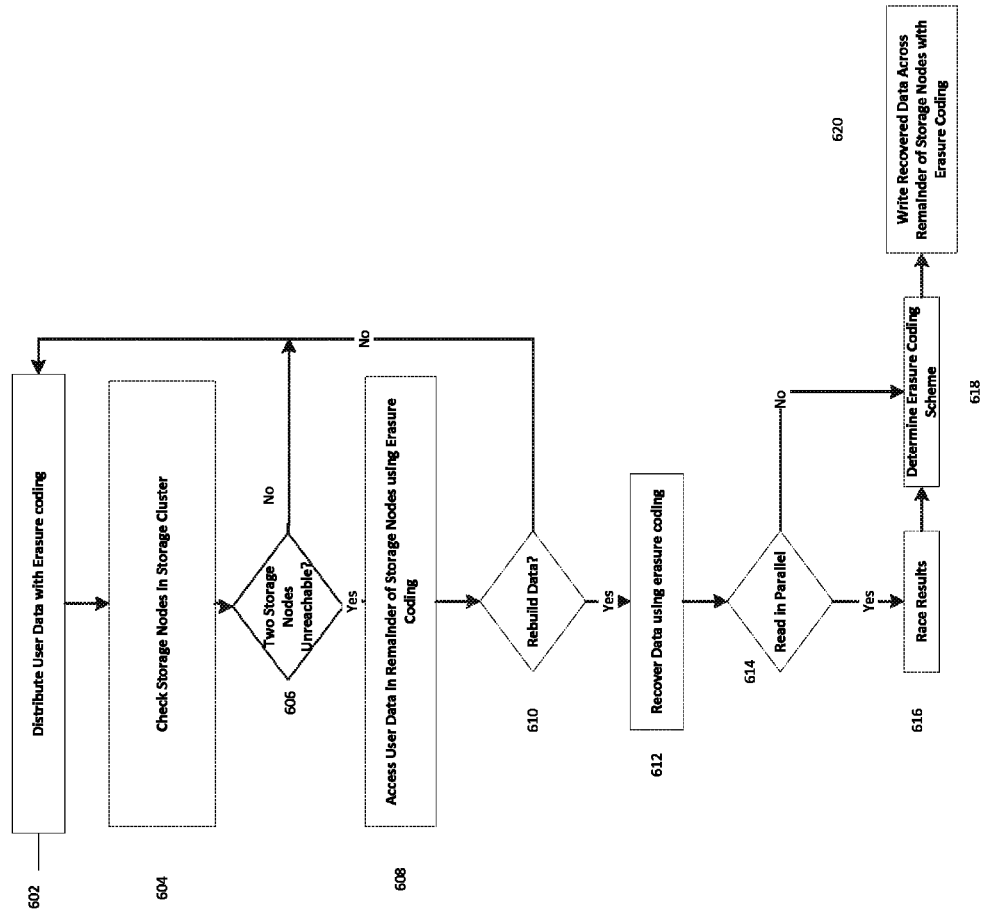
FIG. 6 is a flow diagram for a method of operating a storage cluster in some embodiments.

FIG. 6 is a flow diagram for a method of operating a storage cluster. The method can be practiced on or by various embodiments of a storage cluster and storage nodes as described herein. Various steps of the method can be performed by a processor, such as a processor in a storage cluster or a processor in a storage node. Portions or all of the method can be implemented in software, hardware, firmware or combinations thereof. The method initiates with action 602, where user data is distributed with erasure coding. For example, the user data could be distributed across the storage nodes of a storage cluster using one or more erasure coding schemes. Two erasure coding schemes (or more, in some embodiments) can coexist in the storage nodes in the storage cluster. In some embodiments, each storage node can determine which of a plurality of erasure coding schemes to apply when writing data, and can determine which erasure coding scheme to apply when reading data. These can be the same or differing erasure coding schemes.

The method proceeds to action 604 where the storage nodes in the storage cluster are checked. In some embodiments the storage nodes are checked for a heartbeat where each storage node periodically issues a message which acts as the heartbeat. In alternative embodiments the checking is in the form of querying a storage node, and the lack of response to the query indicates that the storage node is failing. In a decision action 606, it is determined if two storage nodes are unreachable. For example, if two of the storage nodes are no longer issuing heartbeats, or two of the storage nodes fail to respond to queries, or some combination of these or other indications, one of the other storage nodes could determine that two of the storage nodes are unreachable. If this is not the situation, flow branches back to the action 602, in order to continue distributing user data, e.g., writing user data into the storage nodes as the user data arrives for storage. If it is determined that two of the storage nodes are unreachable, flow continues to action 608.

In decision action 608, the user data is accessed in the remainder of the storage nodes, using erasure coding. It should be appreciated that user data refers to data originating from one or more users or client systems or other sources external to the storage cluster in some embodiments. In some embodiments erasure coding types include double redundancy, in which case, with two failed storage nodes, a remaining storage node has readable user data. Erasure coding types could include error correcting code allowing loss of two bits out of a code word, with data distributed across storage nodes so that the data can be recovered despite loss of two of the storage nodes. In a decision action 610, it is determined if the data is to be rebuilt. If the data should not be rebuilt, flow branches back to the action 602, in order to continue distributing user data with erasure coding. If the data should be rebuilt, flow branches to the action 612. In some embodiments, the decision to rebuild the data occurs after two storage nodes are unreachable, although the decision to rebuild the data may occur after one storage node is unreachable in other embodiments. Various mechanisms that could be taken into account in the decision to rebuild the data include error correction counts, error correction rates, failures of reads, failures of writes, loss of heartbeat, failure to reply to queries, and so on. Appropriate modification to the method of FIG. 6 is readily understood for these and further embodiments.

In the action 612, the data is recovered using erasure coding. This could be according to examples of erasure coding as discussed above, regarding the action 608. More specifically, the data is recovered from the remaining storage nodes, e.g., using error correcting code or reading from a remaining storage node, as appropriate. Data could be recovered using two or more types of erasure coding, in cases where these two or more types of erasure coding coexist in the storage nodes. In a decision action 614, it is determined if the data should be read in parallel. In some embodiments, there is more than one data path (e.g., as with double redundancy of data), and the data could be read in parallel across two paths. If the data is not to be read in parallel, flow branches to the action 618. If the data is to be read in parallel, flow branches to the action 616, in which the results are raced. The winner of the race is then used as the recovered data.

In an action 618, the erasure coding scheme for rebuilding is determined. For example, in some embodiments each storage node can decide which of two or more erasure coding schemes to apply when writing the data across the storage units. In some embodiments, the storage nodes cooperate to determine the erasure coding scheme. This can be done by determining which storage node has responsibility for the erasure coding scheme for a specific data segment, or by assigning a storage node to have this responsibility. In some embodiments, various mechanisms such as witnessing, voting, or decision logic, and so on, are employed to achieve this action. Non-volatile solid state storage may act as witnesses (in some embodiments) or voters (in some embodiments), so that if one copy of an authority becomes defective, the remaining functioning non-volatile solid state storage and the remaining copies of the authorities can determine the contents of the defective authority. In an action 620, the recovered data is written across the remainder of the storage nodes, with erasure coding. For example, the erasure coding scheme that is determined for the rebuilding could be different from the erasure coding scheme that is applied in recovering the data, i.e., in reading the data. More specifically, loss of two of the storage nodes may mean that some erasure coding schemes are no longer applicable to the remaining storage nodes, and the storage nodes then switch to an erasure coding scheme that is applicable to the remaining storage nodes.

Figure 7A:
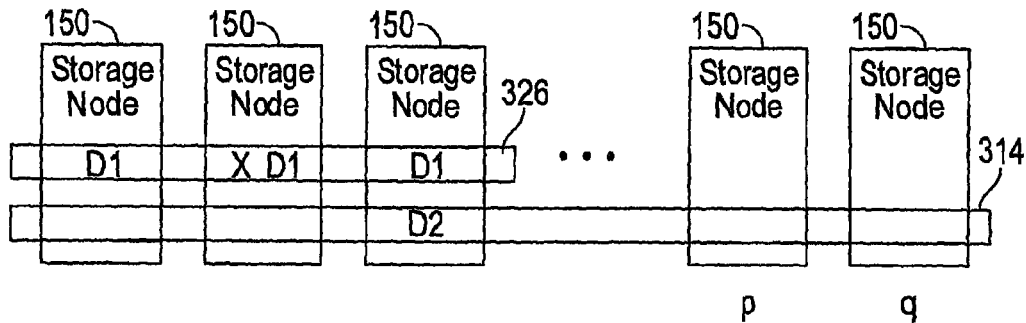
FIG. 7A is a configuration diagram of data stripes of differing sizes, i.e., differing stripe widths in some embodiments.
Figure 7B:
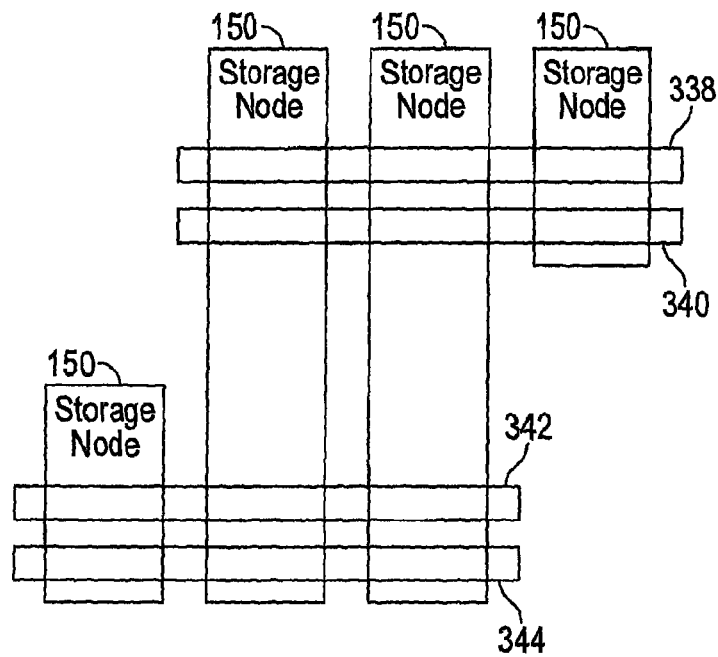
FIG. 7B is a configuration diagram of data stripes across storage nodes of various memory capacities in accordance with some embodiments.

The ability to change configuration of data stripes 314 is one of many features of storage nodes 150 and non-volatile solid-state storages 152. In the examples of FIGS. 7A and 7B data is stored in the form of data stripes 314, 326, 338, 340, 342, 344, in which data is sharded, i.e., broken up and distributed, across multiple storage nodes 150. In some embodiments, data can be striped across non-volatile solid-state storages 152 in a storage node 150 or in multiple storage nodes 150. Various RAID configurations and associated data striping schemes and levels of redundancy are possible, as controlled by the authority 168 for each data segment. A storage node 150 having an authority 168 for a specified data segment could be a storage node 150 acting as a data server, a storage node 150 acting as a parity server, or a storage node 150 having no solid-state storage 152 (compute only). In various arrangements, each storage node 150, or each non-volatile solid-state storage 152, provides one bit of data or one parity bit, for a data stripe 314. Various embodiments implement an error correction code (ECC) that allows recovery of data even if one or two storage nodes 150 fail or are unavailable. In some embodiments, the storage node holding the authority 168 determines which RAID scheme or level and that authority 168 so points to the data stripe 314. Data striping can be applied at a bit level, byte level or block level, and further data striping schemes are possible. In some versions, a storage node 150, or a solid-state storage 152, could contribute more than one bit to a data stripe 314. In some embodiments, an error correction code calculation is performed at each non-volatile solid-state storage 152, for the shard of data that the non-volatile solid-state storage 152 contains from a segment. That shard of data, corrected as needed, is sent back to the storage node 150 that has the authority 168 for the data, where the data is reassembled. More than one stripe type, or RAID scheme or level, can be present across the storage nodes 150 (i.e., coexist in the storage cluster 160), as will be further described below.

FIG. 7A is a configuration diagram of data stripes 314, 326 of differing sizes, i.e., differing stripe widths. These data stripes 314, 326 coexist across the storage nodes 150, or in some embodiments coexist across non-volatile solid-state storage 152. For example, one data stripe 326 is sharded across the three storage nodes 150 in a RAID scheme or level having double redundancy. Identical copies of the data from a first storage node 150 are present in each of the second storage node 150 and the third storage node 150. Since this version of data recovery, in the example data stripe 326, requires two identical copies of data, the storage overhead is 200% more than the data storage capacity. In other words, the relative total storage amount is (N+2N) divided by N, which equals three, for N bits of data, and this is independent of N. Another data stripe 314 is sharded across storage nodes 150 acting as data servers and across storage nodes 150 acting as parity servers providing the p and q parity bits. User data is written to and read from the storage nodes 150 in accordance with a RAID scheme or level having two parity bits, i.e., parity bit p and parity bit q, in this data stripe 314. Since this particular error correction code adds two bits to the data length, the relative storage overhead is related to (N+2) divided by N, for N bits of data. For example, 10 plus 2 redundancy has 20% overhead of memory. The wider data stripe 314 therefore has greater storage efficiency and lower storage overhead than the narrower data stripe 326.

FIG. 7B is a configuration diagram of data stripes 338, 340, 342, 344 across storage nodes 150 of various memory capacities in accordance with some embodiments. As illustrated, two of the storage nodes 150 have greater capacity than two others of the storage nodes 150, for example by a factor of two. All of the capacity of these storage nodes 150 can be used by applying data stripes 338, 340, 342, 344 as shown. For example, two data stripes 338, 340 are applied across two of the higher capacity storage nodes 150 and one of the lower capacity storage nodes 150. Two more data stripes 342, 344 are applied across one of the lower capacity storage nodes 150 and two of the higher capacity storage nodes 150.

The ability of various embodiments to self-configure, on power up or upon removal, replacement or insertion of one or more storage nodes 150 and/or solid-state storages 152 provides a storage memory topology that automatically reconfigures. For example, in a storage cluster with multiple storage nodes 150 and two levels of redundancy, two storage nodes 150 could be lost and data could still be reconstructed, as described above. In a small configuration, the storage cluster 160 could self-configure to store two replicated copies, i.e., mirrors of the data, with 200% storage overhead. In a larger configuration, the cluster could self-configure to have parity pages, with a lower storage overhead. Storage overhead is thus reconfigured as cluster membership changes. The storage nodes 150, solid-state storages 152, and storage cluster 160 which these form can dynamically switch between RAID schemes, and at any moment could have a hybrid combination of RAID schemes. Earlier-formed stripes do not need to be reconstructed when the topology of the storage cluster 160 changes and can be left as is, or reconstructed later according to a new RAID scheme. Storage nodes 150, and non-volatile solid-state storage 152 can switch from one data striping scheme to another in subsequent accesses, i.e., writes or reads, in some embodiments. New data that is arriving can be written to whichever topology is in place at the moment of the data arrival. Adding one or more storage nodes 150, or non-volatile solid-state storage 152, does not require that data be removed from the system for system repartitioning. The topology of the storage cluster 160, e.g., the RAID scheme(s) and storage overhead, are automatically reconfigured as the geometry of the storage cluster 160 and/or storage capacity of each storage node 150 or each non-volatile solid-state storage 152, is changed. The storage nodes 150 and non-volatile solid-state storage 152 thus implement dynamically switching between data striping, e.g., RAID, schemes in a hybrid topology of storage memory.

This flexibility of a storage cluster 160 with storage nodes 150 with regard to data stripes of differing sizes can be exploited during upgrades, data recovery, reconstruction, redistribution, reassignment, etc. For example, a smaller system could have 2 plus 1 redundancy, meaning each data has an identical copy and there is 100% overhead of memory. A larger system could have 10 plus 2 redundancy, meaning there is only 20% overhead of memory. Adding storage capacity, with self-configuring of the system as to redundancy, thus decreases storage overhead and increases storage efficiency. Storage nodes 150 have the capability to determine data striping schemes that make use of essentially all of the available storage capacity of the storage nodes 150. In contrast, fixed data striping schemes waste storage capacity of storage nodes 150 having greater capacity than whichever storage node 150 has the minimum storage capacity of the storage cluster 160. A system could have some data protected by one redundancy scheme, and some data by another redundancy scheme. Data could be protected by different levels of redundancy as a system grows. Hence, numerous data protection schemes may be integrated into the embodiments depending on the application or other desired characteristics. This is a distributed role, in that each of the storage nodes 150 has the ability to independently select the RAID stripe scheme. The storage cluster 160, on a distributed basis, decides where to place the data as the data arrives for writing in some embodiments.

Embodiments as described above provide for noon-disruptive upgrade. This compares to former methods of upgrading, including one method known colloquially as a "forklift upgrade", in which the data must be migrated off of components that are being replaced. Components are then removed and replaced with upgraded components, and the data is migrated back into the new components. In the presently described storage cluster 160, components can be replaced or added, and the system remains online and accessible during the upgrade process. The storage cluster 160 reconfigures to absorb the new components. A full upgrade of the system may occur incrementally through the embodiments described herein. For example, as newer solid-state technology is developed, where the technology has different size limitations than previous generations, the embodiments enable the introduction of the newer solid-state technology to replace a defective storage node, add additional capacity, take advantage of newer technology, etc. In time, the entire system may be replaced and/or upgraded through the incremental storage node replacements. In addition to adding capacity, the embodiments also cover the deletion of capacity in a non-disruptive manner.

Figure 8:
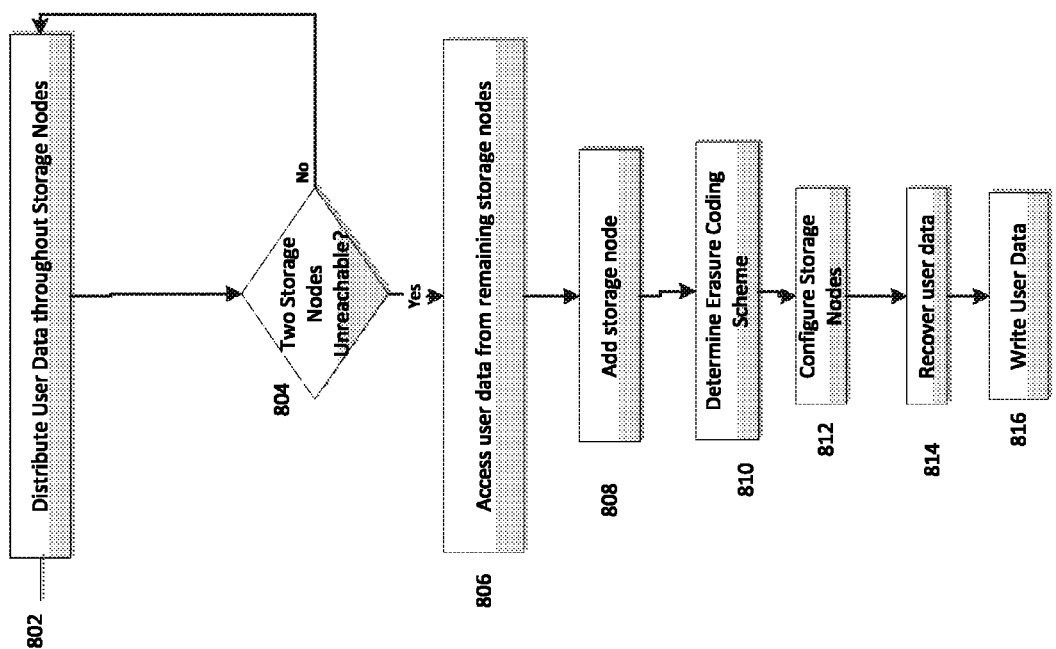
FIG. 8 is a flow diagram of a method for accessing user data in storage nodes, which can be practiced on or by embodiments of the storage cluster, storage nodes and/or non-volatile solid-state storages in accordance with some embodiments.

FIG. 8 is a flow diagram of a method for accessing user data in storage nodes, which can be practiced on or by embodiments of the storage cluster, storage nodes and/or non-volatile solid-state storages in accordance with some embodiments. Many of the actions described in the method can be performed by one or more processors, such as processors on storage nodes and processors in solid-state storages. Portions or all of the method can be implemented in software, hardware, firmware or combinations thereof. The storage nodes and solid-state storages can have same or differing capacities as illustrated in FIGS. 3, 6 and 7. In the method, the storage nodes and solid-state storages can reconfigure if a storage node is added or removed, and can access and reconstruct user data even if two storage nodes fail, all while supporting non-uniform storage sizes and scalability.

In an action 802, user data is distributed throughout the storage nodes of a storage cluster. For example, the storage nodes can self-configure as to one or more data striping schemes that shard data across the storage nodes. Each data striping scheme is in accordance with a level of redundancy of user data. The user data could be distributed across the storage nodes of a storage cluster using one or more erasure coding schemes. Two erasure coding schemes (or more, in some embodiments) can coexist in the storage nodes in the storage cluster. In some embodiments, each storage node can determine which of a plurality of erasure coding schemes to apply when writing data, and can determine which erasure coding scheme to apply when reading data. These can be the same or differing erasure coding schemes.

In a decision action 804, it is determined if two storage nodes are unreachable. If the answer is no, flow branches back to the action 802, in order to continue distributing user data throughout the storage nodes. If the answer is yes, flow branches to the action 806. In the action 806, the user data is accessed from the remaining storage nodes, via the erasure coding. This access could include reading or writing the user data, or reconstructing the user data. For example, since two storage nodes have failed, the user data could be accessed in a redundant copy of the user data in one data striping scheme (e.g., RAID 1), or error correction could be applied to read data from storage nodes applying a data striping scheme (e.g., RAID 6) using N plus 2 redundancy.

In an action 808, a storage node is added. The storage node could have the same storage capacity as other storage nodes, or a differing storage capacity. In an action 810, an erasure coding scheme is determined. For example, adding the storage node could result in the storage nodes determining that a particular erasure coding scheme is suitable for the new total number of storage nodes and makes use of all of the storage capacity of the storage nodes. In an action 812, the storage nodes are configured. This configuration is according to the erasure coding scheme determined in the action 810. In some embodiments the configuration in action 812 initiates automatically in response to detection of the storage node being added.

In an action 814, the user data is recovered. For example, the user data could be recovered from the remaining storage nodes, similar to the access in the action 806. The storage nodes could apply the appropriate erasure coding scheme to recover the user data. In an action 816, the user data is written. For example, the user data that was recovered in the action 814 could be written to the storage nodes configured in the action 812, which is according to the erasure coding scheme determined in the action 810.

Figure 9:
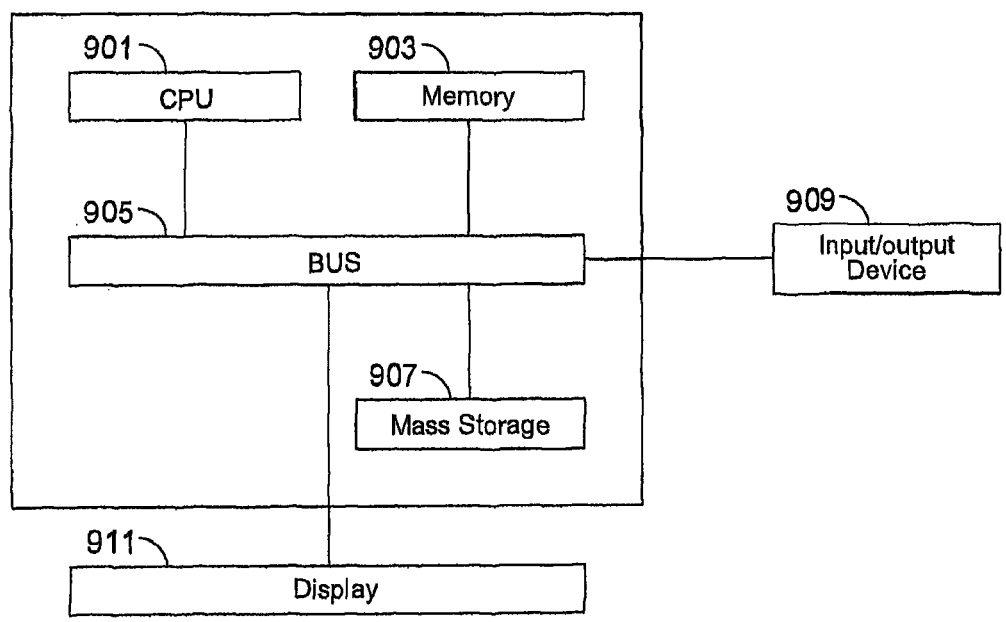
FIG. 9 is an illustration showing an exemplary computing device which may implement the embodiments described herein.

It should be appreciated that the methods described herein may be performed with a digital processing system, such as a conventional, general-purpose computer system. Special purpose computers, which are designed or programmed to perform only one function may be used in the alternative. FIG. 9 is an illustration showing an exemplary computing device which may implement the embodiments described herein. The computing device of FIG. 9 may be used to perform embodiments of the functionality for a storage node or a non-volatile solid-state storage in accordance with some embodiments. The computing device includes a central processing unit (CPU) 901, which is coupled through a bus 905 to a memory 903, and mass storage device 907. Mass storage device 907 represents a persistent data storage device such as a disc drive, which may be local or remote in some embodiments. The mass storage device 907 could implement a backup storage, in some embodiments. Memory 903 may include read only memory, random access memory, etc. Applications resident on the computing device may be stored on or accessed via a computer readable medium such as memory 903 or mass storage device 907 in some embodiments. Applications may also be in the form of modulated electronic signals modulated accessed via a network modem or other network interface of the computing device. It should be appreciated that CPU 901 may be embodied in a general-purpose processor, a special purpose processor, or a specially programmed logic device in some embodiments.

Display 911 is in communication with CPU 901, memory 903, and mass storage device 907, through bus 905. Display 911 is configured to display any visualization tools or reports associated with the system described herein. Input/output device 909 is coupled to bus 905 in order to communicate information in command selections to CPU 901. It should be appreciated that data to and from external devices may be communicated through the input/output device 909. CPU 901 can be defined to execute the functionality described herein to enable the functionality described with reference to FIGS. 1-6. The code embodying this functionality may be stored within memory 903 or mass storage device 907 for execution by a processor such as CPU 901 in some embodiments. The operating system on the computing device may be MS-WINDOWS™, UNIX™, LINUX™, iOS™, CentOS™, Android™, Redhat Linux™, z/OS™, or other known operating systems. It should be appreciated that the embodiments described herein may be integrated with virtualized computing system also.

Detailed illustrative embodiments are disclosed herein. However, specific functional details disclosed herein are merely representative for purposes of describing embodiments. Embodiments may, however, be embodied in many alternate forms and should not be construed as limited to only the embodiments set forth herein.

It should be understood that although the terms first, second, etc. may be used herein to describe various steps or calculations, these steps or calculations should not be limited by these terms. These terms are only used to distinguish one step or calculation from another. For example, a first calculation could be termed a second calculation, and, similarly, a second step could be termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular embodiments only and is not intended to be limiting.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

With the above embodiments in mind, it should be understood that the embodiments might employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing. Any of the operations described herein that form part of the embodiments are useful machine operations. The embodiments also relate to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

A module, an application, a layer, an agent or other method-operable entity could be implemented as hardware, firmware, or a processor executing software, or combinations thereof. It should be appreciated that, where a software-based embodiment is disclosed herein, the software can be embodied in a physical machine such as a controller. For example, a controller could include a first module and a second module. A controller could be configured to perform various actions, e.g., of a method, an application, a layer or an agent.

The embodiments can also be embodied as computer readable code on a non-transitory computer readable medium. The computer readable medium is any data storage device that can store data, which can be thereafter read by a computer system. Examples of the computer readable medium include hard drives, network attached storage (NAS), read-only memory, random-access memory, CD-ROMs, CD-Rs, CD-RWs, magnetic tapes, and other optical and non-optical data storage devices. The computer readable medium can also be distributed over a network coupled computer system so that the computer readable code is stored and executed in a distributed fashion. Embodiments described herein may be practiced with various computer system configurations including hand-held devices, tablets, microprocessor systems, microprocessor-based or programmable consumer electronics, minicomputers, mainframe computers and the like. The embodiments can also be practiced in distributed computing environments where tasks are performed by remote processing devices that are linked through a wire-based or wireless network.

Although the method operations were described in a specific order, it should be understood that other operations may be performed in between described operations, described operations may be adjusted so that they occur at slightly different times or the described operations may be distributed in a system which allows the occurrence of the processing operations at various intervals associated with the processing.

In various embodiments, one or more portions of the methods and mechanisms described herein may form part of a cloud-computing environment. In such embodiments, resources may be provided over the Internet as services according to one or more various models. Such models may include Infrastructure as a Service (IaaS), Platform as a Service (PaaS), and Software as a Service (SaaS). In IaaS, computer infrastructure is delivered as a service. In such a case, the computing equipment is generally owned and operated by the service provider. In the PaaS model, software tools and underlying equipment used by developers to develop software solutions may be provided as a service and hosted by the service provider. SaaS typically includes a service provider licensing software as a service on demand. The service provider may host the software, or may deploy the software to a customer for a given period of time. Numerous combinations of the above models are possible and are contemplated.

Various units, circuits, or other components may be described or claimed as "configured to" perform a task or tasks. In such contexts, the phrase "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. 112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

The foregoing description, for the purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the embodiments and its practical applications, to thereby enable others skilled in the art to best utilize the embodiments and various modifications as may be suited to the particular use contemplated. Accordingly, the present embodiments are to be considered as illustrative and not restrictive, and the invention is not to be limited to the details given herein, but may be modified within the scope and equivalents of the appended claims.

What is claimed is:

1. A plurality of storage nodes in a single chassis, comprising:
    each of the plurality of storage nodes having a storage capacity with nonvolatile solid-state memory for user data storage;
    the plurality of storage nodes configured to support uniform storage capacities and non-uniform storage capacities among the plurality of storage nodes, as a storage cluster; and
    the plurality of storage nodes configured to distribute the user data and metadata throughout the plurality of storage nodes such that the plurality of storage nodes can read the user data, using erasure coding, despite loss of two of the plurality of storage nodes.

2. The plurality of storage nodes of claim 1, wherein the solid-state memory of each of the plurality of storage nodes includes flash memory.

3. The plurality of storage nodes of claim 1, further comprising:
    each of the plurality of storage nodes configured so that the plurality of storage nodes uses all of the storage capacities among the plurality of storage nodes via the erasure coding.

4. The plurality of storage nodes of claim 1, further comprising:
    each of the plurality of storage nodes configured to cooperate with others of the plurality of storage nodes in response to an addition of a further storage node, as to an erasure coding scheme that conforms to a storage capacity of the further storage node.

5. The plurality of storage nodes of claim 1, further comprising:
    each of the plurality of storage nodes configured to determine a data stripe width in accordance with an erasure coding scheme and configured to write the user data to the plurality of storage nodes in support of the uniform storage capacities and the non-uniform storage capacities.

6. The plurality of storage nodes of claim 1, further comprising:
    each of the plurality of storage nodes configured to choose an erasure coding scheme independent of a choice of an erasure coding scheme by others of the plurality of storage nodes.

7. The plurality of storage nodes of claim 1, wherein the erasure coding includes a plurality of RAID (redundant array of independent disks) schemes or a plurality of data stripe schemes.

8. A storage cluster, comprising:
    a plurality of storage nodes within a single chassis;
    each of the plurality of storage nodes having nonvolatile solid-state memory for storage of user data;
    each of the plurality of storage nodes configured to cooperate with others of the plurality of storage nodes having differing storage capacities in applying erasure coding; and
    the plurality of storage nodes configured to distribute the user data and metadata throughout the plurality of storage nodes such that the plurality of storage nodes can access the user data, via the erasure coding, with a failure of two of the plurality of storage nodes.

9. The storage cluster of claim 8, further comprising:
    each of the plurality of storage nodes configured to select an erasure coding scheme with which to stripe data.

10. The storage cluster of claim 8, further comprising:
    each storage node of the plurality of storage nodes configured to broadcast a storage capacity of the storage node; and
    each storage node of the plurality of storage nodes configured to determine how to stripe data, based on storage capacities of the plurality of storage nodes.

11. The storage cluster of claim 8, further comprising:
    each storage node of the plurality of storage nodes configured to create data stripes, according to an erasure coding scheme, that overlap differing subsets of the plurality of storage nodes.

12. The storage cluster of claim 8, further comprising:
    each storage node of the plurality of storage nodes configured to create data stripes, according to an erasure coding scheme, that overlap ones of the plurality of storage nodes having differing storage capacities.

13. The storage cluster of claim 8, wherein ability of the plurality of storage nodes to self-configure upon introduction of a storage node, in combination with the each of the plurality of storage nodes configured to cooperate with others of the plurality of storage nodes having differing storage capacities, supports a non-disruptive upgrade.

14. The storage cluster of claim 8, further comprising:
    each of the plurality of storage nodes configured to cooperate in configuration of the storage cluster as to data striping, responsive to addition of a storage node to the storage cluster.

15. A method for accessing user data in a plurality of storage nodes having nonvolatile solid-state memory, comprising:
    distributing the user data throughout the plurality of storage nodes through erasure coding, wherein the plurality of storage nodes are housed within a single chassis that couples the storage nodes as a storage cluster, and wherein the plurality of storage nodes are configured to accommodate uniform and non-uniform storage capacities of the storage nodes;

determining that two of the plurality of storage nodes are unreachable; and accessing the user data, via the erasure coding, from a remainder of the plurality of storage nodes, wherein a processor performs at least one step of the method.

16. The method of claim 15, further comprising:

adding a storage node, having a storage capacity differing from at least one of the plurality of storage nodes, to the storage cluster;

configuring the plurality of storage nodes, with the added storage node, to a second erasure coding scheme differing from a first erasure coding scheme held by the plurality of storage nodes prior to inclusion of the added storage node.

17. The method of claim 15, further comprising:

reading the user data in the plurality of storage nodes according to a first erasure coding scheme;

writing the user data to the plurality of storage nodes, including at least one storage node with a differing storage capacity, according to a second erasure coding scheme.

18. The method of claim 15, further comprising:

determining an erasure coding scheme based upon available resources of the storage cluster and making use of non-uniform storage capacity among the plurality of storage nodes, wherein the determining is performed by one of the plurality of storage nodes.

19. The method of claim 15, further comprising:

replacing a first storage node, having a first storage capacity, with a second storage node, having a second, differing storage capacity; and configuring the plurality of storage nodes, with the second storage node, to a second erasure coding scheme differing from a first erasure coding scheme used by the first storage node, wherein the configuring is initiated by the plurality of storage nodes in response to replacing the first storage node.

20. The method of claim 15, further comprising:

adding a storage node to the storage cluster, the storage node having a differing storage capacity from one of the plurality of storage nodes;

recovering the user data from the remainder of the plurality of storage nodes; and writing the user data to the remainder of the plurality of storage nodes plus the added storage node.

* * * * *